United States Patent [19]

Morris et al.

[11] Patent Number: 4,836,043
[45] Date of Patent: Jun. 6, 1989

[54] CONNECTING ROD ASSEMBLY

[75] Inventors: Leslie C. Morris, Washington; John K. Amdall, Peoria, both of Ill.

[73] Assignee: Caterpillar Inc., Peoria, Ill.

[21] Appl. No.: 802,088

[22] Filed: Nov. 27, 1985

Related U.S. Application Data

[63] Continuation of Ser. No. 433,472, filed as PCT US 82/00622 on May 10, 1982, published as WO83/04077 on Nov. 24, 1983, abandoned.

[51] Int. Cl.$^4$ .............................................. G05G 1/00
[52] U.S. Cl. ........................... 74/579 E; 74/579 R; 403/22; 403/405.1; 411/88
[58] Field of Search ............ 74/579 R, 579 E, 579 F; 29/156.5 A; 123/197 AB; 403/22, 408, 405, 337, 404; 411/88, 98, 116, 119, 120, 123, 220

[56] References Cited

U.S. PATENT DOCUMENTS

| | | | |
|---|---|---|---|
| 230,913 | 8/1880 | Alexander | 411/123 |
| 391,624 | 10/1888 | Lee | 411/90 |
| 504,296 | 8/1893 | Beam | 411/99 |
| 1,819,784 | 8/1931 | McKone | 74/579 E |
| 2,405,424 | 8/1946 | Herreshoff | 74/579 E |
| 2,473,096 | 6/1949 | Hamill et al. | 74/579 E |
| 2,879,092 | 3/1959 | Hargrove et al. | 74/579 E |
| 2,921,655 | 1/1960 | McGregor | 411/116 |
| 3,351,116 | 11/1967 | Madsen | 411/102 |
| 3,790,236 | 2/1974 | Pierce | 74/579 E |
| 3,859,976 | 1/1975 | McWhorter | 74/579 E |
| 3,926,236 | 12/1975 | Pouch et al. | |
| 3,936,203 | 2/1976 | Lowder et al. | |
| 3,967,669 | 7/1976 | Egner | |
| 4,012,157 | 3/1977 | Krause et al. | |
| 4,015,874 | 4/1977 | Hennessy | |
| 4,050,494 | 9/1977 | de Claire | |
| 4,056,893 | 11/1977 | Willard | |
| 4,114,961 | 9/1978 | Pithie | 74/579 E |

FOREIGN PATENT DOCUMENTS

| | | | |
|---|---|---|---|
| 888033 | 11/1943 | France | 74/579 E |
| 915525 | 11/1946 | France | 74/579 E |
| 573441 | 8/1944 | United Kingdom | 74/579 E |

Primary Examiner—Richard E. Moore
Assistant Examiner—Vinh Luong
Attorney, Agent, or Firm—Larry G. Cain

[57] ABSTRACT

A bolt retainer (10,110) for holding bolts (22,23,122,123) against rotation consists of a flat plate (12,112) having two or more bolt holes (18,20,118,120) therethrough and an upstanding portion (14,114). Specifically configured bolts (22,32,122,132) have surfaces (28,128) that abut the upstanding portion (4,114) thereby preventing rotation of the bolts (22,32,122,132) upon applying a nut (46) thereto.

1 Claim, 2 Drawing Sheets

CONNECTING ROD ASSEMBLY

This is a continuation of Ser. No. 433,472, filed as PCT US82/00622 on May 10, 1982, published as WO83/04077 on Nov. 24, 1983, now abandoned.

TECHNICAL FIELD

This invention relates to a bolt retainer. In particular, it relates to a bolt retainer for use with connecting rods in engines to prevent rotation of the bolt upon assembly of the engine.

BACKGROUND ART

The connecting rod of an internal combustion engine or a reciprocating compressor is usually affixed to the crankshaft of the engine or compressor by placing a bearing cap opposite the connecting rod about the bearing on the crankshaft and bolting the bearing cap to the connecting rod. In order to accomplish this, the mechanic ordinarily must place a wrench on the bolt head while the nut is tightened on the opposite end of the bolt. In some engines access to the top and bottom of the connecting rod in the vicinity of the crankshaft may be accomplished by rotation of the crankshaft, thereby permitting relatively easy assembly. However, the space available in some engines or compressors makes it impossible to reach the head end of the bolt in order to fix a wrench to the connecting rod bolt head.

It has therefore become the practice to machine a ledge having a flat surface and a vertical back wall on the rod portion of the connecting rod/cap combination so that some sort of the locking may be accomplished between the bolt head and connecting rod. The machining process quite frequently will cause a sharp edge or an area of stress concentration in the metal of the connecting rod. After many cycles of the crankshaft, the loads induced into the connecting rod can cause the connecting rod to fail through these areas of stress concentration. Furthermore, the removal of metal in a connecting rod may tend to weaken the connecting rod unnecessarily. In the past, this has been overcome by making a larger forging than necessary in order to achieve the necessary ledge for retaining the bolt head while retaining the required strength.

A single retaining mechanism for a single bolt on a flat surface would be possible, but would rotate unless held stationary. This may be overcome by folding portions of the retainer, one portion folded up against the head of the bolt with the other portion folded down over the material being fastened. Such retainers may, however, be difficult to use.

The present invention is directed to overcoming one or more of the problems as set forth above.

DISCLOSURE OF THE INVENTION

In one aspect of this invention, a bolt retainer is disclosed that consists of a non-compressable plate having substantially parallel faces with the plate defining at least two bores and an upstanding portion generally normal to the faces of the plate. The upstanding portion is laterally displaced from a line defined by the centers of the bores.

In the past, fixture of the bearing cap to a connecting rod in large engines was accomplished by placing the bolt head against a specially machined surface to prevent rotation of the bolt during fixture of the nut thereto. Such an arrangement required not only special machining but special surface treatment of the metal after the machining in order to reduce stress in the metal. The present invention eliminates most of the special machining, which may result in areas of stress concentration, by utilizing a flat surface rather than the use of a ledge while permitting use of bolts without requiring a wrench to hold the bolt during tightening.

BEST MODE OF CARRYING OUT THE INVENTION

Figure 2:
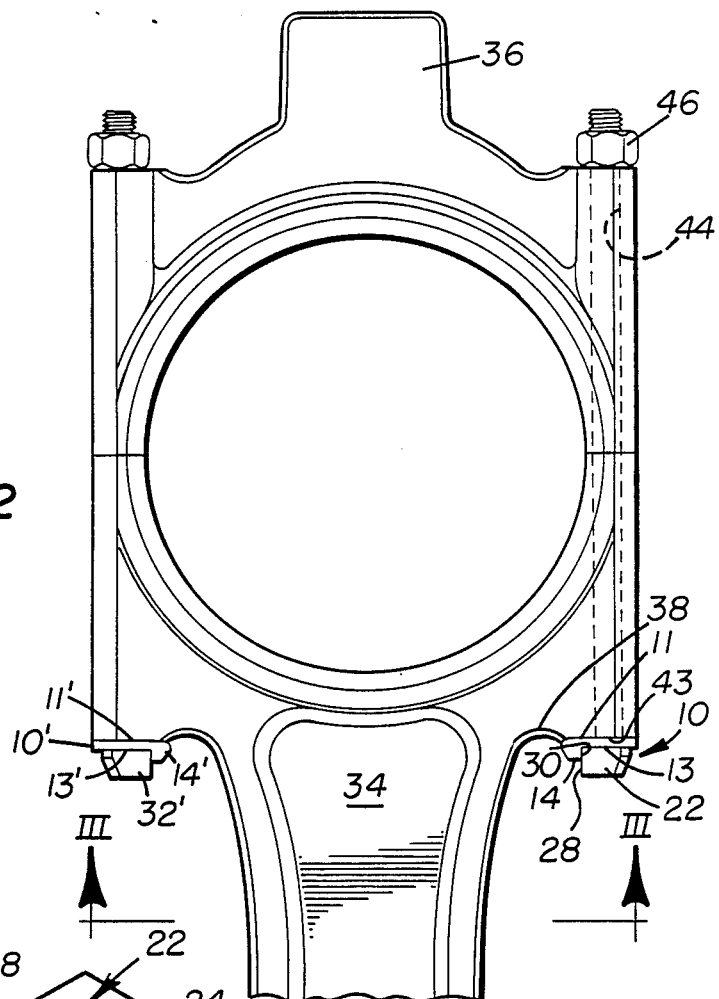
FIG. 2 is an elevational view of an assembled connecting rod embodying the bolt retainer depicted in FIG. 1.
Figure 1:
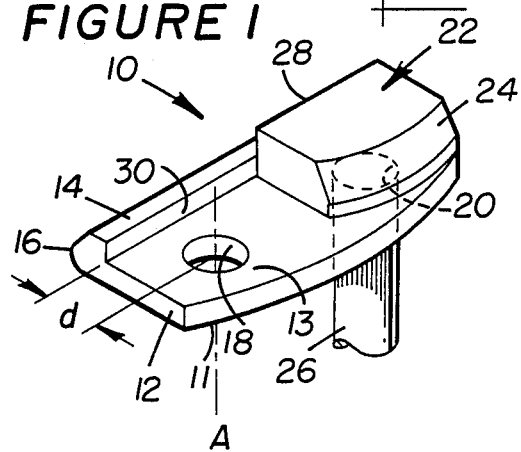
FIG. 1 is a perspective view of the bolt retainer with one bolt in location which forms an embodiment of the present invention.
Figure 3:
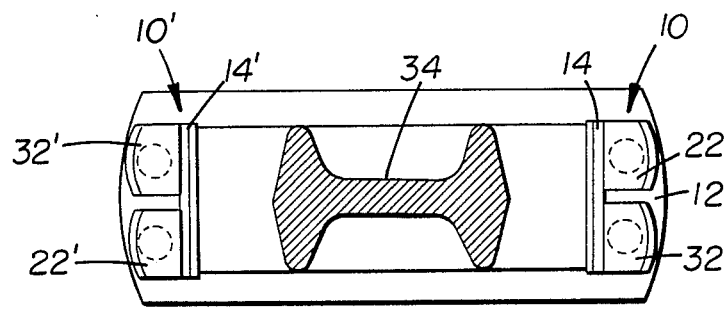
FIG. 3 is a sectional view of the connecting rod shown in FIG. 2 showing the bolt retainer that forms an embodiment of the present invention.

Referring now to FIG. 1, a bolt retainer 10 is shown in perspective. While this retainer is particularly useful to facilitate the assembly of large internal combustion engine connecting rods as shown in FIGS. 2 and 3, it is equally useful in other applications where two or more bolt heads must be held against rotation.

Bolt retainer 10 consists of a flat, noncompressible plate 12 having parallel faces 11 and 13, and having an upstanding abutment portion 14 along one edge 16 of plate 12 normal to face 13. In the preferred embodiment, abutment portion 14 has a flat edge 30 normal to face 13. Formed in plate 12 are at least two bores 18 and 20 positioned so that the distance from flat edge 30 to the axis A of the bore is equal to a predetermined distance "d". It should be noted that the distance "d" is somewhat greater than the radius of each of the bores 18 and 20.

A bolt 22 having a specially formed head 24 is also shown in FIG. 1 with the shaft 26 of the bolt extending through one of the bores 20. Head 24 has formed along one edge a flat edge 28 spaced outwardly from the axis of shaft 26 a distance no more than the predetermined distance "d". Preferably, flat edge 28 is spaced from the shaft axis slightly less than the predetermined distance "d" so that with the bolt 22 positioned in bore 20, flat edge 28 abuts flat edge 30 of upstanding portion 14. While the remaining faces of bolt head 24 may be of any shape, it may be appropriate to form those faces in the manner depicted in FIG. 1. It should be noted that bore 18 should be spatially separated from bore 20 so that a second bolt 32 may be used in conjunction with the first bolt 22, thereby preventing rotation of plate 12. Nonrotation of plate 12 with the flat edges of the heads of bolts 22 and 32 abutting flat edge 30 permits fixture of nuts on the bolts without use of a wrench on the bolt head.

Industrial Applicability

Referring now to FIGS. 2 and 3, the bolt retainer 10 may be seen used in conjunction with a connecting rod 34 of an internal combustion engine or compressor. Connecting rod 34 includes a bearing cap 36 which is fixed to the connecting rod 34 by a plurality of bolts, in this case four. It should be noted that bolt retainer 10 is used on both sides of connecting rod 34 and is denoted accordingly as 10 and 10'. Reference will be made to the unprimed numerals; however, the description is equally applicable to the primed numerals.

Bolt retainer 10 is placed adjacent a flat surface 43 of connecting rod 34 so that bolts 22 and 32 may be passed through bores such as bore 44. Bearing cap 36 may then be positioned over the crankshaft (not shown) and nuts 46 threaded onto bolts 22 and 32. Bolt 32 is then positioned as shown in FIG. 2 with flat edge 28 adjacent flat edge 30 of bolt retainer 10. With the second bolt 22 in position as shown in FIG. 3, the nut 46 may be tightened on bolt 32 without rotation of the bolt. This is accomplished because flat edge 28 is abutting flat edge 30 while the bolt 10 is held in position relative bolt 32 by bolt 22.

Use of bolt retainer 10 eliminates a good deal of machining, therefore allowing a larger fillet 38 to remain after the minimum machining necessary to form flat surface 43. In particular, it eliminates the necessity for machining a ledge into the connecting rod, thereby eliminating a stress concentrator within the connecting rod that must be relieved before installation.

Alternate Embodiment

Figure 4:
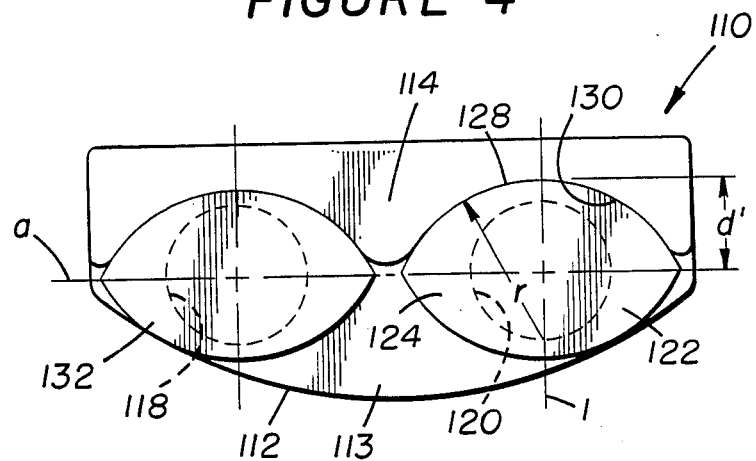
FIG. 4 is a plan view of an alternate embodiment.

Referring now to FIG. 4, an alternate embodiment of the bolt retainer is illustrated. In FIG. 4, elements are numbered in the manner of the preferred embodiment except the numbers have been increased by a factor of 100, thus the alternate embodiment of the bolt retainer is numbered 110.

Retainer 110 has a flat portion 112 defining flat surface or face 113 parallel to a second surface (not shown) and an upstanding abutment portion 114 in the manner of the preferred embodiment; however, edge 130 which is normal to face 113, is curvilinear. In the illustrated alternate embodiment, edge 130 corresponds to two connected arcs of circles such that the minimum separation between edge 130 and the centerline of the bores 130 is equal to a predetermined distance d'. It should be noted that in accord with good practice the connection between the arcs is a smooth curve of small radius. The radius of the arcs forming edge 130 is greater than d' and the center of each arc forming edge 130 is located on a line "1" passing through the center of bore 120 and normal to line "a" connecting the centers of the two bores 120.

The bolts 122 and 132 have edges 128 conforming to the arcs forming upstanding abutment portion 114. The shapes of the non-abutting surfaces of bolts 122 and 132 are not to be considered as limited to the depicted shapes; however, symmetrical bolt heads, as shown, may be appropriate. Further, while the surface 130 is depicted as a pair of arcs, other surfaces that would act as an abutment for a conforming edge of a bolt would also be appropriate and are considered to be within the scope of this invention.

While this invention has been shown with specific reference to a connecting rod, it is equally applicable to other machine installations wherein bolts must be tightened while access to the head is impossible or severely restricted.

I claim:

1. A connecting rod assembly comprising:
   a connecting rod having a longitudinal axis, a flat surface, a large fillet intersecting the flat surface and positioned between the flat surface and the longitudinal axis, and a pair of fastening holes disposed on the same side of the longitudinal axis and passing through the flat surface:
   a bearing cap defining a pair of fastening holes disposed in line with the pair of fastening holes in the connecting rod;
   a retainer plate having parallel faces, a pair of holes through the faces, and a fixed upstanding abutment portion substantially perpendicular to said faces and spaced from said holes, said retainer plate being positioned in contact with the flat surface of the connecting rod and being free of contact with all other portions of the connecting rod, said pair of holes through the faces being aligned with said pair of fastening holes in the connecting rod;
   a pair of elongate bolts each having a head and a flat edge formed on the head, said elongate bolts extending through the pair of fastening holes of the connecting rod and retainer plate and said edge of the head abutting the upstanding abutment portion of the retainer plate wherein the bolts prevent rotation of the retainer plate and the plate prevents rotation of the bolts; and
   a pair of nuts threadedly attached to the bolts so that said bearing cap and said retainer plate are attached to the connecting rod assembly when said nuts are tightened on the bolts while the fixed upstanding abutment portion of the retainer plate prevents rotation of the bolts during said tightening.

* * * * *